(12) United States Patent
Tenny et al.

(10) Patent No.: US 10,652,759 B2
(45) Date of Patent: May 12, 2020

(54) APPARATUS AND METHOD FOR RADIO RESOURCE MANAGEMENT FOR HIGH RELIABILITY AND LOW LATENCY TRAFFIC

(71) Applicant: Futurewei Technologies, Inc., Plano, TX (US)

(72) Inventors: Nathan Edward Tenny, Poway, CA (US); Bin Liu, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 759 days.

(21) Appl. No.: 15/139,155

(22) Filed: Apr. 26, 2016

(65) Prior Publication Data

US 2017/0311182 A1  Oct. 26, 2017

(51) Int. Cl.
*H04W 24/02* (2009.01)
*H04L 5/00* (2006.01)
(Continued)

(52) U.S. Cl.
CPC ........... *H04W 24/02* (2013.01); *H04L 5/0044* (2013.01); *H04L 5/0055* (2013.01);
(Continued)

(58) Field of Classification Search
CPC .................................................. H04W 24/02
See application file for complete search history.

(56) References Cited

U.S. PATENT DOCUMENTS

2008/0198800 A1\* 8/2008 Zhang ............... H04W 72/1257
370/329
2011/0170515 A1   7/2011 Kim
(Continued)

FOREIGN PATENT DOCUMENTS

| CN | 103069734 A | 4/2013 |
|---|---|---|
| CN | 103733711 A | 4/2014 |

(Continued)

OTHER PUBLICATIONS

Huawei, Hisilicon, "Support for Wide Bandwidth for 5G," 3GPP TSG RAN WG1 Meeting #84bis, R1-162158, Busan, Korea, Apr. 11-15, 2016, 3 pages.

(Continued)

*Primary Examiner* — Samina F Choudhry
(74) *Attorney, Agent, or Firm* — Slater Matsil, LLP

(57) ABSTRACT

Embodiments are provided for managing and mitigation contention of high reliability and low latency transmissions in wireless communications networks. According to an embodiment, a network entity indicates a first grant to a first device associated with a first service. The first grant includes a first resource for transmitting for the first service and a second resource for retransmitting for the first service. The network entity also indicates a second grant to a second device associated with a second service. The second grant includes the first resource for transmitting for the second service and a third resource for retransmitting for the second service. A third grant is also indicated to a third device associated with a third service. The third grant includes the first resource for transmitting for the third service. The first service and the second service have higher transmission reliability and latency requirements than the third service.

21 Claims, 6 Drawing Sheets

(51) Int. Cl.
| | |
|---|---|
| H04W 76/27 | (2018.01) |
| H04L 29/08 | (2006.01) |
| H04W 12/06 | (2009.01) |
| H04W 28/02 | (2009.01) |
| H04W 72/04 | (2009.01) |
| H04W 72/12 | (2009.01) |
| H04W 72/14 | (2009.01) |

(52) U.S. Cl.
CPC .......... *H04L 5/0091* (2013.01); *H04L 69/323* (2013.01); *H04L 69/324* (2013.01); *H04W 12/06* (2013.01); *H04W 28/0268* (2013.01); *H04W 72/042* (2013.01); *H04W 72/0446* (2013.01); *H04W 72/0453* (2013.01); *H04W 72/1226* (2013.01); *H04W 72/14* (2013.01); *H04W 76/27* (2018.02); *H04L 5/0053* (2013.01)

(56) References Cited

U.S. PATENT DOCUMENTS

| | | | |
|---|---|---|---|
| 2011/0249630 | A1 | 10/2011 | Kim et al. |
| 2013/0142160 | A1* | 6/2013 | Hoshino ............... H04L 1/1861 370/329 |
| 2013/0163540 | A1 | 6/2013 | Roh et al. |
| 2013/0165084 | A1* | 6/2013 | Xu ........................ H04L 67/02 455/414.1 |
| 2014/0105164 | A1* | 4/2014 | Moulsley ............ H04W 72/042 370/329 |
| 2016/0066355 | A1* | 3/2016 | Chakraborty ........... H04W 4/21 726/3 |
| 2016/0262160 | A1* | 9/2016 | Mo ........................ H04L 41/50 |
| 2016/0262176 | A1 | 9/2016 | Moulsley et al. |
| 2017/0230989 | A1* | 8/2017 | Garcia ............. H04W 72/1242 |

FOREIGN PATENT DOCUMENTS

| | | |
|---|---|---|
| CN | 103974427 A | 8/2014 |
| JP | 2010537542 A | 12/2010 |
| WO | 2015094069 A1 | 6/2015 |
| WO | 2016022314 A1 | 2/2016 |

OTHER PUBLICATIONS

Huawei, Hisilicon, "Overview of 5G Frame Structure," 3GPP TSG RAN WG1 Meeting #84bis, R1-162157, Busan, Korea, Apr. 11-15, 2016, 6 pages.

"3rd Generation Partnership Project; Technical Specification Group Services and System Aspects; Feasibility Study on New Services and Markets Technology Enablers; Stage 1 (Release 14)", 3GPP TR 22.891, V14.0.0, Mar. 2016, 95 pages.

Chen, D., et al., "INCUS: A Communication Protocol for Safety Critical Distributed Real Time Systems", The 20th Asia-Pacific Conference on Communication, 2014, pp. 309-314, Pattaya.

Fischer, G., "Vision Paper and Proposal on Unified PMSE", European Microwave Week 2013, Oct. 11, 2013, 11 pages.

"Mobile and Wireless Communications Enablers for the Twenty-Twenty Information Society (METIS)", METIS, ICT-317669-METIS/D2.4, Feb. 28, 2015, 190 pages, Version 1.

Ericsson; "TR Text Proposal Capturing Outcome of [91#29][LTE/Latency] and [91bis#04][LTE/LATRED]", 3GPP TSG-RAN WG2 #91bis, Tdoc R2-154929, Oct. 5-9, 2015, 39 pages.

Schotten, H.D., et al., "Availability Indication as Key Enabler for Ultra-Reliable Communications in 5G", European Conference on Networks and Communications, 2014, 5 pages, Bologna.

Strom, E., et al., "5G Ultra-Reliable Vehicular Communication", Oct. 3, 2015, Ver. 1.1, 13 pages.

Suriyachai, P., et al., "A Survey of MAC Protocols for Mission-Critical Applications in Wireless Sensor Networks", IEEE Communications Surveys & Tutorials, Second Quarter 2012, pp. 240-264, vol. 14, No. 2.

Weiner, M., et al., "Design of a Low-Latency, High-Reliability Wireless Communication System for Control Applications", IEEE International Conference on Communications, 2014, pp. 3829-3835, Sydney, NSW.

Huawei, Hisilicon,"Overview of Resource Allocation Mechanism for V2V," 3GPP TSG RAN WG1 Meeting #82b, R1-155662, Malmo, Sweden, Oct. 5-9, 2015, 3 pages.

Qualcomm Incorporated, "Frame structure requirements", 3GPP TSG-RAN WG1 #84b, R1-162206, Apr. 11-15, 2016, 9 Pages, Busan, Korea.

Samsung, "USe of RRM measurements in IRAT DC", 3GPP TSG-RAN2#95 bis meeting, R2-166661, Oct. 10-14, 2016, 4 pages, Kaohsiung, Taiwan.

\* cited by examiner

APPARATUS AND METHOD FOR RADIO RESOURCE MANAGEMENT FOR HIGH RELIABILITY AND LOW LATENCY TRAFFIC

TECHNICAL FIELD

The present invention relates to wireless communications, and, in particular embodiments, to an apparatus and method for radio resource management for high reliability and low latency traffic.

BACKGROUND

In wireless communication systems, some communications and services are considered more critical or of higher priority than others. Typically, more critical or higher priority traffic requires higher reliability transmissions. For example, communications in the fifth generation (5G) wireless communications systems include ultra-high reliability (UHR) communications that require more robust transmission schemes to guarantee high reliability of delivery of the associated traffic. In addition to high reliability transmissions, UHR communications can require stringent lower latency requirements, referred to as ultra-low latency (ULL), due to the urgent nature of such communications. The UHR communications can belong to services of high quality of service (QoS) requirements. Examples of UHR communications include vehicular applications, industrial controls, medical applications, and other critical applications where a very high level of traffic delivery certainty within a deadline is required. Some UHR applications also involve infrequent small transmissions, e.g., alarm notifications or control packets. For such cases, it may be inefficient to reserve a resource block, such as a transmission time interval (TTI), since such blocks may be frequently unused and therefore wasted. Furthermore, when a transmission is needed it may still have a strict latency requirement. Accordingly, existing methods of scheduling radio traffic may not be appropriate to meet the requirements of these use cases, due to the inefficiency of reserving unused resource blocks and the time required to establish a new resource block reservation. An efficient scheme of radio resource management is needed for high reliability and low latency traffic such as for 5G UHR communications.

SUMMARY OF THE INVENTION

In accordance with an embodiment, a method for radio resource management for high reliability wireless communications is disclosed. The method includes indicating, by a network entity, a first grant to a first device associated with a first service. The first grant includes a first resource for transmitting for the first service and a second resource for retransmitting for the first service. The method also includes indicating a second grant to a second device associated with a second service. The second grant includes the first resource for transmitting for the second service and a third resource for retransmitting for the second service. A third grant is also indicated to a third device associated with a third service. The third grant includes the first resource for transmitting for the third service. The resources can be frequency regions of the transmission bandwidth over a time interval. The resources can also be transmission time intervals (TTI) scheduled by the network. The first service and the second service have higher transmission reliability and latency requirements than the third service.

In accordance with another embodiment, another method for handling wireless transmissions from multiple transmitters is disclosed. The method includes sending, by a first device to a network, a first transmission for a first service on a first transmission resource allocated to the first service, to a second service associated with a second device, and to a third service associated with a third device. The first service and the second service have higher transmission reliability and latency requirements than the third service. The devices can be any wireless communications devices including UEs, such as smartphones, tablets, or desktop/laptop computers that communicate with a network entity such as a base station, e.g., a LTE evolved node B (eNB). The devices may also be wireless enabled devices that are not primarily communication devices, e.g., Internet of Things (IoT) devices. For example, the devices can include alarm systems, medical monitors, or embedded control modules in factory equipment. The method further includes receiving, at the first device from the network, an indication of a failure of the first transmission upon a contention on the first transmission resource between the first transmission and a second transmission for the second service from the second device. The method further includes resending by the first device at least a portion of the first transmission for the first service on a second transmission resource allocated to the first service without the second service.

In accordance with another embodiment, another method for handling wireless transmissions from multiple transmitters is disclosed. The method includes sending, by a first device to a network, a first transmission for a first service on a first transmission resource allocated to the first service, to a second service associated with a second device, and to a third service associated with a third device. The first service and the second service have higher transmission reliability and latency requirements than the third service. The method further includes receiving, by the first device from the network, a group acknowledgment on a shared downlink resource for the first service and the second service. The group acknowledgement includes an identifier of the second service and excludes an identifier of the first service. The method further includes resending, by the first device, the first transmission for the first service on a second transmission resource allocated to the first service without the second service.

In accordance with another embodiment, another method for handling wireless transmissions from multiple transmitters is disclosed. The method includes receiving by a network entity, such as a base station, from a first device a first transmission for a first service. The first transmission is received on a first transmission resource allocated to the first service, to a second service associated with a second device, and to a third service associated with a third device. The first service and the second service have higher transmission reliability and latency requirements than the third service. The method further includes receiving by the network entity, from the second device, a second transmission for the second service, and upon successfully receiving the second transmission and failing to receive the first transmission, sending to the first device and the second device a group acknowledgment on a shared downlink resource for the first service and the second service. The group acknowledgement includes an identifier of the second service and excludes any identifier of the first service. The method further includes receiving from the first device a retransmission of the first transmission for the first service on a second transmission resource allocated to the first service without the second service.

In accordance with another embodiment, a network entity such as a base station for managing wireless transmissions from multiple transmitters is disclosed. The network entity includes at least one processor coupled to a memory and a non-transitory computer readable storage medium storing programming for execution by the at least one processor. The programming includes instructions to indicate a first grant to a first device associated with a first service. The first grant includes a first resource for transmitting for the first service and a second resource for retransmitting for the first service. The programming also includes instructions to indicate a second grant to a second device associated with a second service. The second grant includes the first resource for transmitting for the second service and a third resource for retransmitting for the second service. The programming includes further instructions to indicate a third grant to a third device associated with a third service. The third grant includes the first resource for transmitting for the third service. The first service and the second service have higher transmission reliability and latency requirements than the third service.

In accordance with another embodiment, a wireless communications device is disclosed. The device includes at least one processor coupled to a memory and a non-transitory computer readable storage medium storing programming for execution by the at least one processor. The programming including instructions to send to a network a first transmission for a first service on a first transmission resource allocated to the first service, to a second service associated with a second wireless communications device, and to a third service associated with a third wireless communications device. The first service and the second service have higher transmission reliability and latency requirements than the third service. The programming also includes instructions to receive from the network an indication of a failure of the first transmission upon a contention on the first transmission resource between the first transmission and a second transmission for the second service from the second wireless communications device. The programming includes further instructions to resend at least a portion of the first transmission for the first service on a second transmission resource allocated to the first service without the second service.

In accordance with another embodiment, a wireless communications device is disclosed. The device includes at least one processor coupled to a memory and a non-transitory computer readable storage medium storing programming for execution by the at least one processor. The programming includes instructions to send to a network a first transmission for a first service on a first transmission resource allocated to the first service, to a second service associated with a second device, and to a third service associated with a third device. The first service and the second service have higher transmission reliability and latency requirements than the third service. The programming also includes instructions to receive from the network a group acknowledgment on a shared downlink resource for the first service and the second service. The group acknowledgement includes an identifier of the second service and excluding any identifier of the first service. The programming further includes instructions to resend the first transmission for the first service on a second transmission resource allocated to the first service without the second service.

In accordance with yet another embodiment, a network entity supporting wireless transmissions from multiple transmitters is disclosed. The network entity includes at least one processor coupled to a memory and a non-transitory computer readable storage medium storing programming for execution by the at least one processor. The programming includes instructions to receive from a first device a first transmission for a first service on a first transmission resource allocated to the first service, to a second service associated with a second device, and to a third service associated with a third device. The first service and the second service have higher transmission reliability and latency requirements than the third service. The programming also includes instructions to receive from the second device a second transmission for the second service, and upon successfully receiving the second transmission and failing to receive the first transmission, send to the first device and the second device, a group acknowledgment on a shared downlink resource for the first service and the second service. The group acknowledgement includes an identifier of the second service and excluding any identifier of the first service. The programming includes further instructions to receive from the first device a retransmission of the first transmission for the first service on a second transmission resource allocated to the first service without the second service.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

High priority wireless communications and services require high reliability transmissions, e.g., in comparison to lower priority traffic. Transmission reliability reflects the level of guarantee of traffic or packet delivery within a time interval. High reliability communications, such as ultra-high reliability (UHR) communications in 5G systems, may carry packets of sporadic nature (e.g., control packets) and may occur at any point in time. In some cases the time interval is short enough that a communication cannot wait for a scheduling opportunity to be obtained according to existing methods, e.g., requesting and receiving a grant of dedicated radio resources. System and method embodiments are provided herein for managing high reliability transmissions without the need for advanced scheduling of these transmissions. The critical traffic requiring high reliability is transmitted using selected radio resource blocks shared with other traffic. The schemes can be implemented in any wireless or radio communications systems such as for example, Long Term Evolution (LTE) systems, 5G or New Radio (NR) systems, Device-to-Device (D2D) communications systems, Machine-to-Machine (M2M) systems, and others.

According to the embodiments, the high reliability transmission can occur on a sub-resource block or sub-transmission time interval (TTI) basis, for instance using predetermined symbols of the TTI. The high reliability transmission can be repeated multiple times to allow combining gain at the receiver and mitigate contention between multiple transmissions. The high reliability traffic may also require low latency, such as the ultra-low latency (ULL) requirement in 5G communications systems. For instance, the low latency requirement can be less than one millisecond (ms) or within a small duration that does not allow closed-loop transmission schemes. Assigning radio resources at sub-resource block or sub-TTI granularity to the high reliability transmissions and allowing multiple transmissions over multiple sub-blocks or sub-TTIs can satisfy the low latency requirement of such traffic. The embodiments also include acknowledgment (ACK) and retransmission mechanisms, and contention management for high reliability services on overlapping resources.

Figure 1:
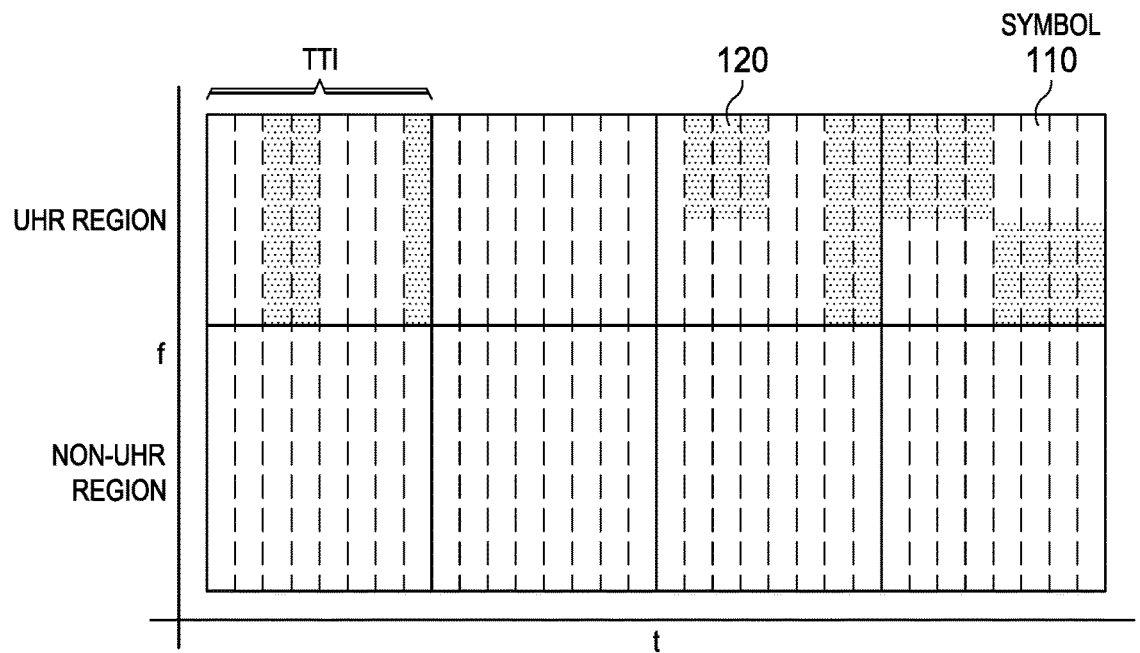
FIG. 1 shows an embodiment of radio resource allocation for high reliability communications.

FIG. 1 shows an embodiment of radio resource allocation for high reliability communications. A region of radio resource blocks 110 and 120 is shown including a first region (labeled UHR region) for high reliability traffic, and a second region (labeled non-UHR region) for other classes of traffic, e.g., for services with lower priority or QoS requirements. Each block represents a frequency region of the transmission bandwidth over a time interval. In the UHR region, some resource blocks or sub-blocks 120 are selected to allow the high reliability transmission of the critical or high priority traffic that requires such transmission. Otherwise, when such traffic does not occur, the same selected blocks or sub-blocks 120 can be used for transmitting other non-high reliability traffic.

In various embodiments, the blocks or sub-blocks 120 selected for high reliability traffic can extend over a whole carrier, a group of resource blocks, selected symbols (e.g., orthogonal frequency division multiplex (OFDM) symbols) within a TTI, or other suitable grouping of resources. Allowing the non-high reliability traffic to be carried on the same high reliability communications resources prevents wasting such resources when no high reliability transmissions occur, and hence improves link utilization. The remaining resource blocks 110 in the UHR region can be used for non-high reliability traffic and not for high reliability communications. In the non-UHR region, all resource blocks 110 are dedicated for non-high reliability communications. It is also desirable not to allocate traffic types other than the designated high reliability traffic to the selected resource blocks 120 to avoid or limit contention or loss of critical traffic types.

Specifically, no high reliability transmissions can occur in the non-UHR region, and only those selected blocks or sub-blocks 120 of the UHR-region can be used to transmit the high priority or critical traffic requiring high reliability. To receive the high reliability traffic, a device such as a user equipment (UE) can listen to only the selected resource blocks 120 for such traffic, which saves device power by reducing the active time required for the receiver. However, since non-high reliability traffic is allowed within the same selected blocks 120, there is a need for some mechanism to resolve contention between the two traffic types from multiple transmitters. The mechanism should give priority to the high reliability traffic. For instance, the high reliability traffic can be configured with higher transmit power, more favorable modulation and coding scheme (MCS), or other parameters that guarantee a high likelihood that the high reliability traffic is successfully received in case of contention with other traffic on the same selected resources.

Further, the high reliability transmission can be repeated multiple times on the selected resources, which allows combining gain at the receiver. The mechanism should also allow some recovery method for the non-high reliability traffic that occurs on the same resources. For example, successive interference cancellation (SIC), forward error correction (FEC), cyclic redundancy check or HARQ schemes can be used for such recovery. The network may also schedule the non-high reliability traffic that tolerates some degree of loss to the high reliability traffic resources. The non-high reliability traffic may also be retransmitted at a higher transmission layer protocol than the physical layer for recovery.

Figure 2:
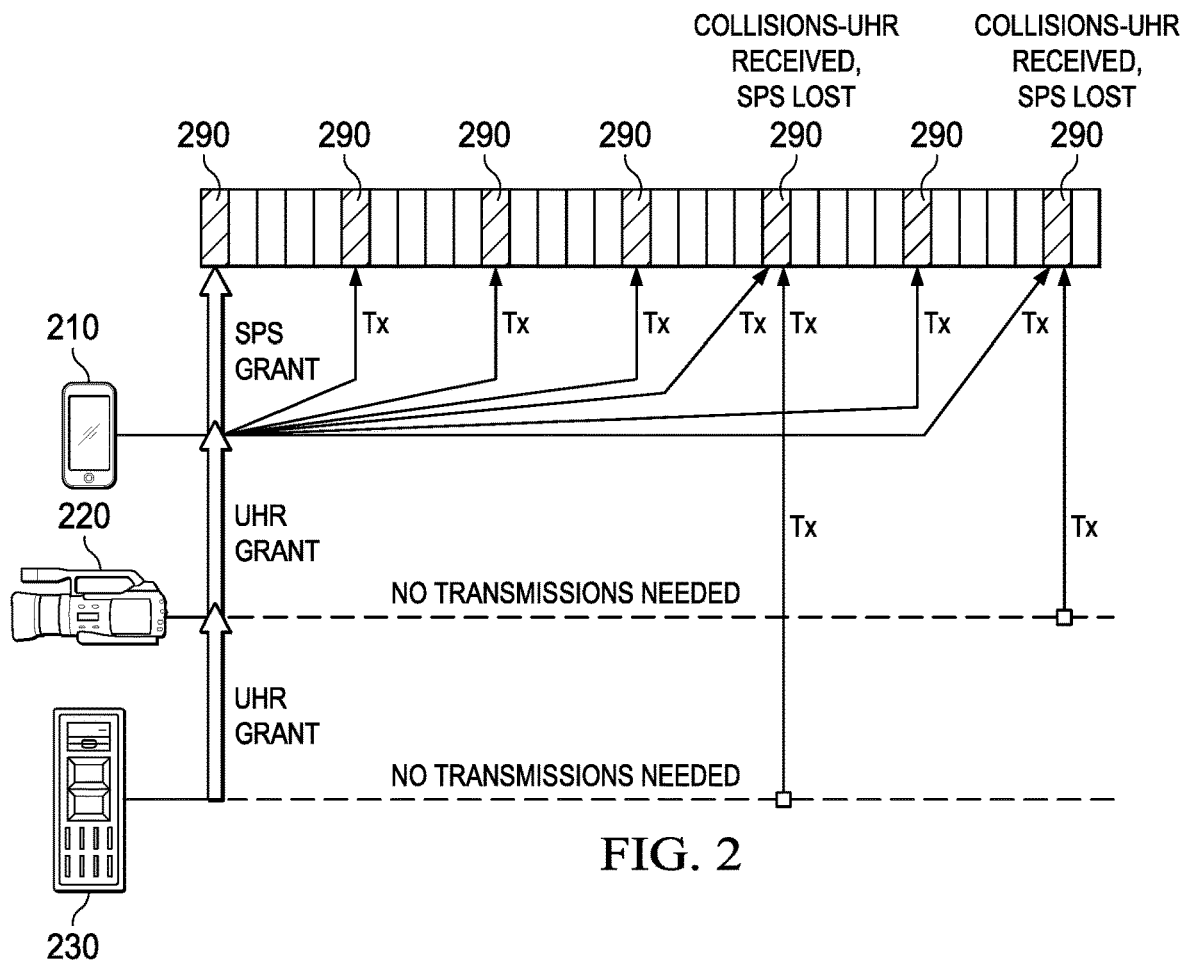
FIG. 2 shows an embodiment scheme for managing high reliability communications.

FIG. 2 shows an embodiment scheme for high reliability transmissions in the uplink from multiple devices to a network. The devices can be any wireless communications devices including UEs, such as smartphones, tablets, or desktop/laptop computers that communicate with a network entity such as a base station, e.g., an eNB. The devices may also be wireless enabled devices that are not primarily communication devices, e.g., Internet of Things (IoT) devices. For example, the devices can include alarm systems, medical monitors, or embedded control modules in factory equipment. In this scenario, devices 220 and 230 are given a grant, referred to herein as a UHR grant, on selected resources 290 for high reliability services. The UHR grant is assigned per service rather than being available for any service associated with the device or user, e.g., in contrast to existing cellular systems where radio resources are granted to a particular device without a restriction to particular services. The UHR grant can be used by devices 220 and 230 for services with high reliability requirement and without scheduling at the time of a transmission. A user device 210, e.g., a smartphone, is also given a semi-persistent scheduling (SPS) grant for non-UHR user traffic on the same resources 290. For example, any of the selected high reliability blocks or sub-blocks 120 (symbols or sub-TTIs) in the UHR region of FIG. 1 can be assigned to both the UHR grant and the SPS grant. In FIG. 2, there is no contention on the resources 290 when the user device 210 transmits on the SPS grant while the devices 220 and 230 do not transmit on the UHR grant. However, there is a contention scenario when any of the devices 220 or 230 transmit a service, for instance an alarm message, on the UHR grant simultaneously with a transmission of the user device 210 on the SPS grant. In this case, the transmission on the SPS grant is lost to the higher reliability transmission on the UHR grant, by design. The user device 210 lost data may be recovered by some mechanism if available, such as FEC, HARQ, radio link control (RLC) retransmission, transmission control protocol (TCP), or others. Alternatively, the service on the user device 210 for which traffic occupies the SPS grant may be tolerant of limited data loss, e.g., a voice call in which the occasional loss of a single voice frame is acceptable.

The SPS and UHR grants have some periodicity in terms of TTIs. For example, in the case of a 5×TTI periodicity, the high reliability transmissions face an average delay of 2.5×TTI and a maximum of 5×TTI between the triggering event and the next transmission opportunity. The UHR grant should take the latency requirements of the service into account. For instance, services with high reliability and low latency requirements need the opportunity to transmit at any time to a granularity under 1 ms. The number of repetitions should be selected so as not to exceed the allowable transmission latency for the high reliability service.

Figure 3:
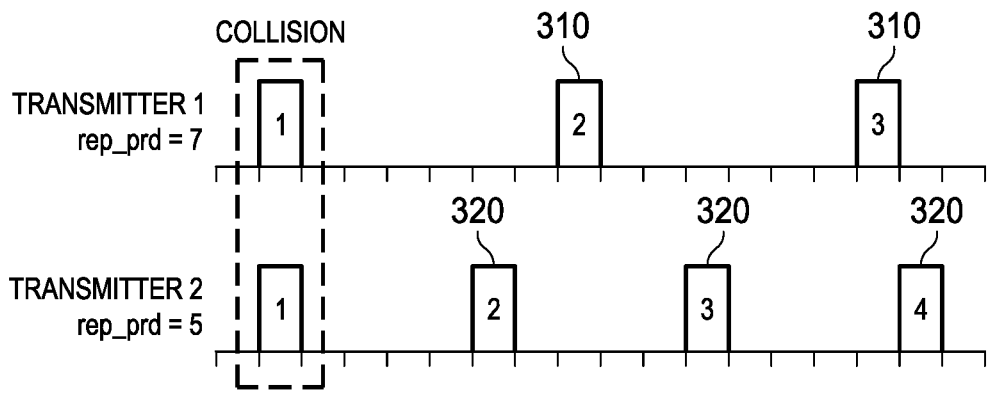
FIG. 3 shows an embodiment scheme for mitigating traffic contention from multiple transmitters.

When assigning a shared UHR grant for two or more different high reliability transmission services, contention mitigation between such services is needed. Traffic contention can be mitigated using time, frequency or code multiplexing of transmissions from multiple transmitters. FIG. 3 shows an embodiment scheme for mitigating traffic contention from multiple transmitters. To reduce contention, the network schedules the high reliability traffic of two transmitters, labeled Transmitter 1 and Transmitter 2, in a manner to reduce simultaneous transmissions from the transmitters over time. This is achieved by scheduling at least some of the repetitions or retransmissions 310 and 320 of Transmitter 1 and Transmitter 2, respectively, on different resources. For example, Transmitter 1 is assigned a repetition period of 7 TTIs while Transmitter 2 is assigned a repetition period of 5 TTIs. Thus, the second and third retransmissions 310 and 320 of the two transmitters respectively do not overlap and no traffic contention occurs from such repetitions. The different repetition cycles introduce a pseudo-orthogonality in transmission time between the transmitters. The retransmissions could be either blind or ACK/NACK-based, depending on the time scale and the capabilities of the system. However, the repetition period can cause further transmission delays. Therefore, the repetition period for a service or transmitter needs to be determined with care so as not to cause excessive delay, for example, no more than a few symbols for a transmit opportunity for high reliability and low latency services.

In embodiments, an additional orthogonality layer is used to mitigate contention between high reliability transmissions from multiple transmitters. In addition to the time multiplexing scheme, the multiple transmitters can use code or frequency multiplexing for their high reliability transmissions, for instance by repeating transmissions on different frequencies. The additional orthogonality layer can also be used to satisfy the low latency requirement for high reliability transmissions. The orthogonality layer may provide true orthogonality, or it may provide a pseudo orthogonality that increases the likelihood of successful simultaneous decoding of two signals even though the signals are not fully orthogonal.

Figure 4A:
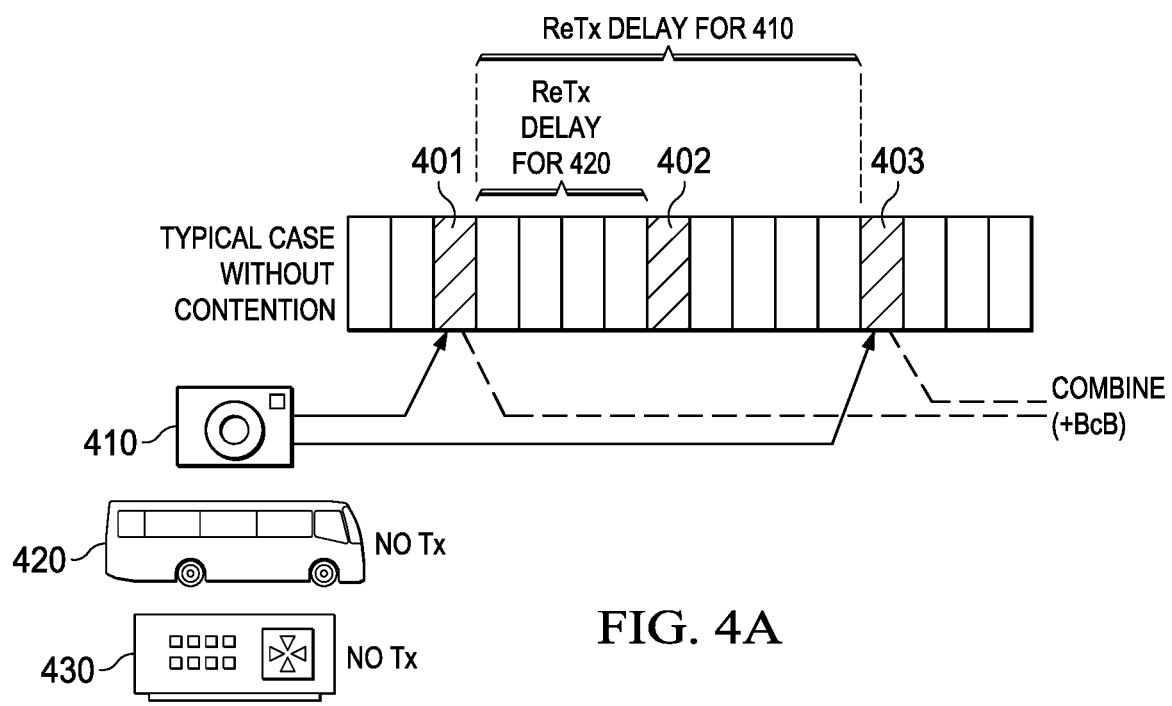
FIGS. 4A and 4B show a scenario of managing contention for wireless retransmissions of multiple transmitters.
Figure 4B:
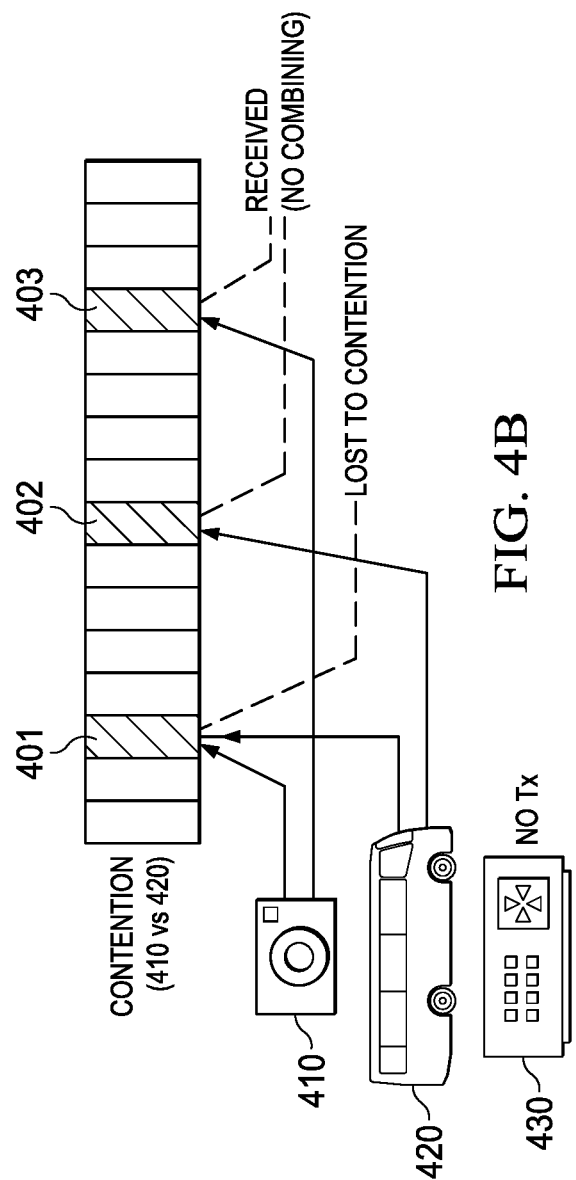

FIGS. 4A and 4B show a scenario of managing contention for wireless retransmissions of multiple transmitters according to an embodiment. In this scenario, multiple transmissions with different grants are allowed to collide. If the probability of any given device transmitting in any given grant is small, then the probability of simultaneous contention is reduced. Specifically, device 410 (e.g., a smartphone or digital camera) shares its initial transmission resources with device 420 (e.g., a mobile communications device). The initial transmissions for devices 410 and 420 are allocated the resource block 401. Device 410 shares its repetition resources with device 430. The repetitions for device 410 and 430 are allocated the resource block 403. Further, device 430 (e.g., a set-top box) can share its initial transmission resource with the repetition resources for device 420. The shared resources include resource block 402. In this scenario, the probability of contention on both the initial and repeated transmissions for any device may be within the acceptable loss probability. Assuming low probability of a transmission within a resource block, a single repetition of transmission by any device allows about 3 dB of combining gain at the receiver, as shown in FIG. 4A. In FIG. 4B, the combining gain drops in the case of contention of transmissions for devices 410 and 420 in resource block 401. However, the repeated transmission for device 410 can be received without contention in block 403. Similarly, the repeated transmission for device 420 can be received without contention in block 402.

In embodiments, additional or alternative contention management techniques can be used. The contention management techniques include using quick scheduling requests, differential transmit time offsets, carrier sense multiple access (CSMA), request to send/clear-to-send signaling, or other techniques. Some techniques may cause hidden node problems which could not be resolved within high reliability transmission constraints. A fast contention resolution procedure is needed in such scenarios, which could add some latency to the transmission. For services where latency bounds are loose enough, such techniques could be feasible, e.g., as used for contention-based random access channel (RACH) procedure in LTE.

In an embodiment, a HARQ or similar mechanism is used with the time, frequency or code multiplexing of transmissions between multiple transmitters. The HARQ mechanism allows contention detection and avoiding unnecessary repetitions, which also reduces the probability of contention. For instance, if a device detects an acknowledgement for its transmission as part of the HARQ mechanism, it may refrain from further transmissions of the same content, thus avoiding the chance that such further transmissions contend with signals from another device. In respect of the implementation of such a HARQ mechanism, it is noted that if two devices transmitting in the same uplink resources have different downlink resources for their ACK signals, there is no need to identify the successful transmitter explicitly in the downlink transmission. The choice of ACK resources can identify the successful transmitter implicitly without the need for further indication or signaling.

To implement the contention mitigation schemes above, the scheduler at the network is made aware of the services with high reliability transmission requirements and of the services' associated devices. The devices can register such services with the network via some registration process. The registration can be implemented at the time of establishing the service, for instance at time of bearer establishment, which is not a time critical process. In an embodiment, the registration process includes an authorization step to verify that the device is allowed to register with a high reliability transmission service. The authorization can use a handshake mechanism relating to the requesting device's identity/subscription. The authorization process can also include provisioning of QoS parameters and the extended parameters specific to high reliability transmissions.

The device registration process for the high reliability transmission service is updated whenever the entity responsible for traffic scheduling for the UE changes, such as at every cell change or base station change. The device may not need to remain connected after registration as long as the device maintains itself in a condition where it can transmit when necessary, e.g., maintains its uplink timing to the level of accuracy needed for grant-free uplink transmissions. During registration, the network can deliver QoS parameters for the high reliability transmission service. Examples of the QoS parameters include the maximum per-burst block size, the minimum duty cycle, and the maximum bit rate, e.g., the maximum bit rate that can be demanded within the allowed packet latency window or within the minimum duty cycle time. Once registered, the service is assigned a persistent UHR grant. The UE may be constrained in its use of the UHR grant so as to prevent it from being occupied by data for other services. The assignment can include frequency information such as hopping patterns or other deterministic change information to resolve contention of repetitions for different services. The assignment can also include intra-TTI resource assignment (e.g., symbol assignment) to match the time dimension with latency requirements. Assignment information can also include repetition parameters such as HARQ or other repetition parameters. A short identifier of the service can also be exchanged with the assignment information. The identifier can be used to distinguish downlink transmissions such as for ACK signaling. Other information may also be included such as constraints of transport formats or modulation code scheme (MCS)/power bounds to control transmission power, manage link budgets and/or reduce blind search space.

Although devices can be managed by the network with coordination across an area larger than a single cell (i.e., inter-cell coordination), the UHR grants are coordinated and managed per-cell. However, communications between different cells or between different base stations may be used to reduce interference between UHR transmissions managed by the different cells. For instance, inter-cell interference coordination (ICIC)/enhanced ICIC (eICIC) mechanisms can be used to avoid conflicting high reliability transmission resources at a cell edge. Similar coordination techniques may apply between different scheduling areas in some cases. For example, if a single scheduler is responsible for radio resources over an area more than one cell, the single scheduler may coordinate with schedulers responsible for adjacent areas to avoid or reduce interference. The device population across cells may change in real time, requiring the scheduler to reassign resources accordingly. The device registration for high reliability transmission can be rejected if the scheduler determines that it lacks resources.

In an embodiment, a conservative MCS and transmit power for UHR grant assignment is selected to meet the high reliability requirement. In this context a "conservative MCS" refers to an MCS selected to enable a link budget with more headroom than would ordinarily be required, e.g., a lower order of modulation. As an aspect of selecting link parameters, e.g., MCS and transmit power, link adaptation can be used semi-statically for high reliability transmission. Link adaptation can improve transmission reliability such as when the device with the high reliability transmission is physically close to the network and can achieve a favorable link budget. To enable link adaptation, the devices with high reliability transmission services maintain channel state information (CSI) reporting to allow the scheduler to update the UHR grant assignment parameters accordingly. In the absence of link adaptation, the scheduler may determine MCS, transmit power, and other link parameters based on an estimated link budget for communication with the required level of reliability for the service.

For link adaptation applicable to downlink traffic, the device with high reliability transmission measures downlink signal quality and feeds it back to the network according to CSI procedures, e.g., reporting periodicity and wideband/sub-band channel quality indicator (CQI). The network can adapt its MCS for downlink transmissions, and notify the device of the resulting update to its grant parameters. The update can be sent via higher layer signaling, e.g., as a media access control (MAC) control element (MAC CE) instead of being sent in-band with traffic on the high reliability transmission radio resources. The use of higher-layer transport would allow reliable delivery, for instance using radio link control (RLC) acknowledged mode (AM), so that the network and device UE know that the MCS is in sync. Thus, the actual high reliability downlink transmission does not need to contain an indicator of the MCS.

A similar procedure can be used for uplink traffic for link adaptation. For instance, the device sends sounding reference signals (SRS) or a similar measurable uplink signal so that the network can update the MCS and power control information for future uplink transmissions based on measuring the uplink signal. The updates for UHR assignment could be sent in MAC or other control signaling. If the device misses an MCS update, the next high reliability transmission may have a mismatch between the sent and expected formats. Since the MCS mismatch would affect the link budget, it is preferred to use reliable transport for the updates. The network can send the update in a MAC control element (CE) using RLC AM. One possible solution is having the device send an acknowledgement of the update in the uplink. Another solution is to include a MCS indicator in the high reliability transmission traffic. In yet another solution, the MCS is indicated in downlink only and the network adapts using semi-blind decoding in the uplink. Thus, if the current MCS is not decoded correctly, the network assumes that the device is using a previous MCS and decodes with the previous MCS as an alternative hypothesis. The periodic update of MCS could be done on uplink only.

Figure 5:
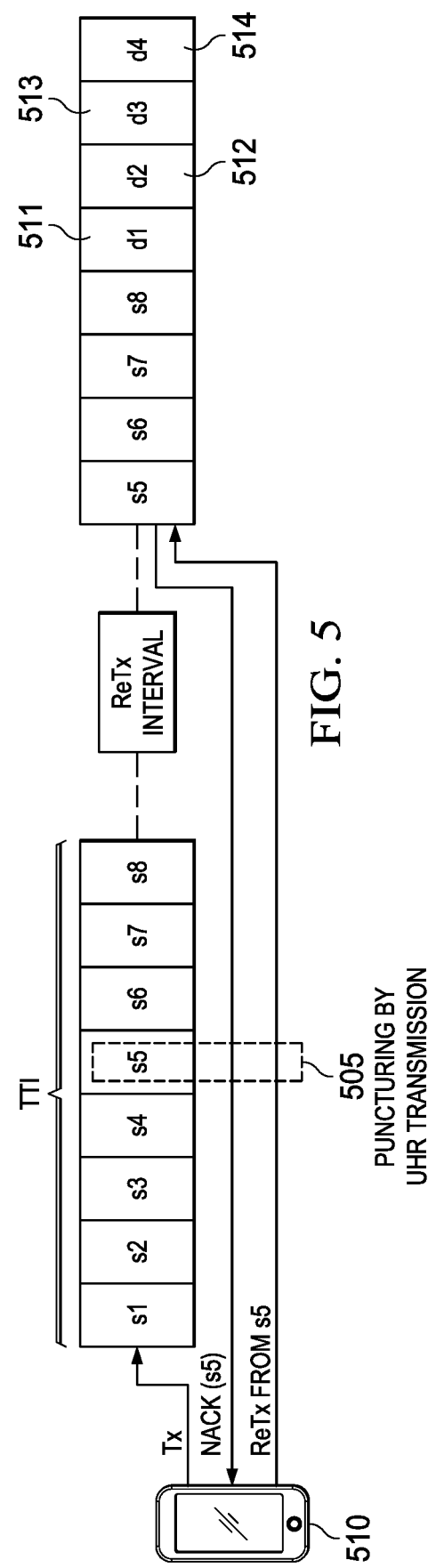
FIG. 5 shows an embodiment scheme of traffic contention recovery with a combination of hybrid automatic repeat request (HARQ) and indication of lost symbols.

For high reliability transmission services, e.g., that are not subject to severe tight deadlines or low latency requirements, further reliability can be offered by a HARQ scheme. Enhanced HARQ mechanisms can also be used to recover from contention scenarios. FIG. 5 shows an embodiment scheme of traffic contention recovery with a combination of HARQ and indication of lost symbols. In this scenario, normal user transmission of device 510 collides with high reliability transmission traffic in the uplink on the fifth symbol 505 of a TTI. As a result, the decoding of device 510 transmission fails on that symbol. The receiver can thus indicate that retransmission of device 510 should start at the fifth symbol 505. This is achieved by including an indication of channel quality in a NACK to device 510. If the indication shows that the channel quality is good, the device may infer that the lost symbol was due to short-term interference rather than to general degradation of the channel conditions, and that a retransmission of the lost symbol(s) is a more appropriate response than other link adaptation techniques such as changing the MCS or increasing the power for a subsequent retransmission. The NACK additionally indicates the fifth symbol 505 where interference occurred due to collision of device 510 transmission with the high reliability transmission. In response, the device 510 begins a partial retransmission either by starting at the lost symbol(s) or by sending the lost symbol(s), which is the fifth symbol 505 in this case. The symbol indication in the NACK allows the device 510 to save data in retransmission, e.g., instead of using a more conservative MCS to retransmit its traffic. As a result of the saved data space in retransmission, the device may combine the retransmission with a portion of new data such as the symbols 511 to 514 (d1, d2, d3, and d4). In an embodiment, a redundant version (RV) sequence is used for retransmission, which indicates retransmission data only includes a subset of the data, e.g., the data which is interfered by the high reliability transmission traffic (here, the fifth symbol 505) or the data which is interfered together with subsequent data (here, the fifth symbol 505 along with symbols s6, s7, and s8).

Implementing a HARQ scheme for high reliability transmissions may have challenges. In the uplink direction, the network may not know when a transmission is coming, and thus may not be able to distinguish a "message not received" condition (which should cause the network to send a NACK indication) from a "no message present" condition (which should cause the network to refrain from sending any ACK/NACK indication). For downlink transmissions, the network should be able to know which high reliability transmission services/devices have had data sent on the airlink, since the network itself is the transmitter, so it can distinguish the services for which it expects to receive an ACK indication from the services for which it does not expect to receive an ACK indication because they were not transmitted. The network does not need to reserve uplink resources for ACK/NACK use until the transmission has actually been sent. Therefore, in the downlink direction, existing ACK/NACK mechanisms can be used provided the latency requirements for the concerned services are compatible with the timelines of such existing mechanisms.

For uplink transmissions, sending an explicit NACK may not be useful since the high reliability transmissions may not be scheduled in advance, meaning that the network cannot easily know if a transmission occurred which it failed to receive correctly. Thus, the downlink indication can be considered as an ACK-only signal, and the NACK indication can be implicit by having no acknowledgment sent. For resource allocation, the system can take advantage of the fact that transmissions from/to each service are typically sparse. This sparseness makes it feasible to use overlapping ACK resources in the downlink to respond to separate high reliability transmissions in the uplink, relying on sparseness to prevent practical conflict and on a group-ACK mechanism to resolve conflicts in case they occur. This can be achieved by using the same resources assigned for use to send an ACK indicator for each of two or more high reliability transmissions on different resources.

Figure 6:
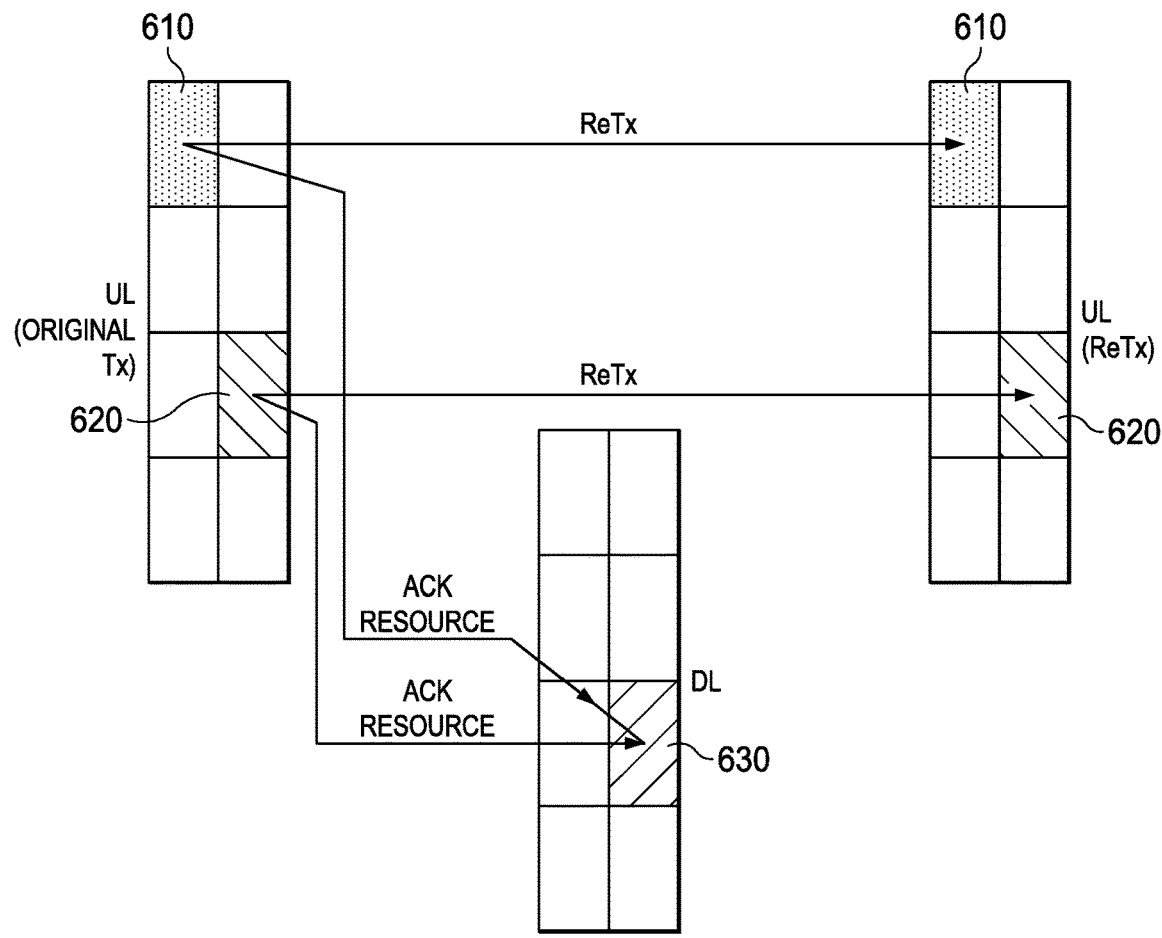
FIG. 6 shows an embodiment scheme of using overlapping acknowledgement (ACK) resources for multiple high reliability transmissions.

FIG. 6 shows an embodiment scheme of using the same acknowledgement (ACK) resources for multiple high reliability transmissions. The scheme can be applied on any time scale and for any transmission protocol layer. Since higher layers are likely to have looser scheduling and be able to indicate individual recipients in signaling messages, the scheme can be used at the HARQ level or at a low-level with a short-cycle acknowledgement-and-retransmission scheme in which bits on the air are at a premium price. The same ACK resource block 630 can be used for two or more services on different resources. For example, ACK resource block 630 can be assigned on downlink (DL) for both service resources 610 and 620 on uplink (UL). In this case, the ACK returned on downlink is not ambiguous when only one of the services on resource 610 or resource 620 is transmitted on uplink and received successfully. Furthermore, if both services are transmitted and received successfully, the ACK can safely be applied to both. Alternatively, if neither signal is received, the implicit or passive NACK (e.g., no transmission) causes both services to retransmit. However, in the case when one signal is received and the other is lost, the ACK which shares the same resource block 630 for both services becomes ambiguous. This situation is referred to herein as a NACK2ACK error, where any device detecting the ACK signal requires a means to distinguish which of the two services was successfully received.

Figure 7:
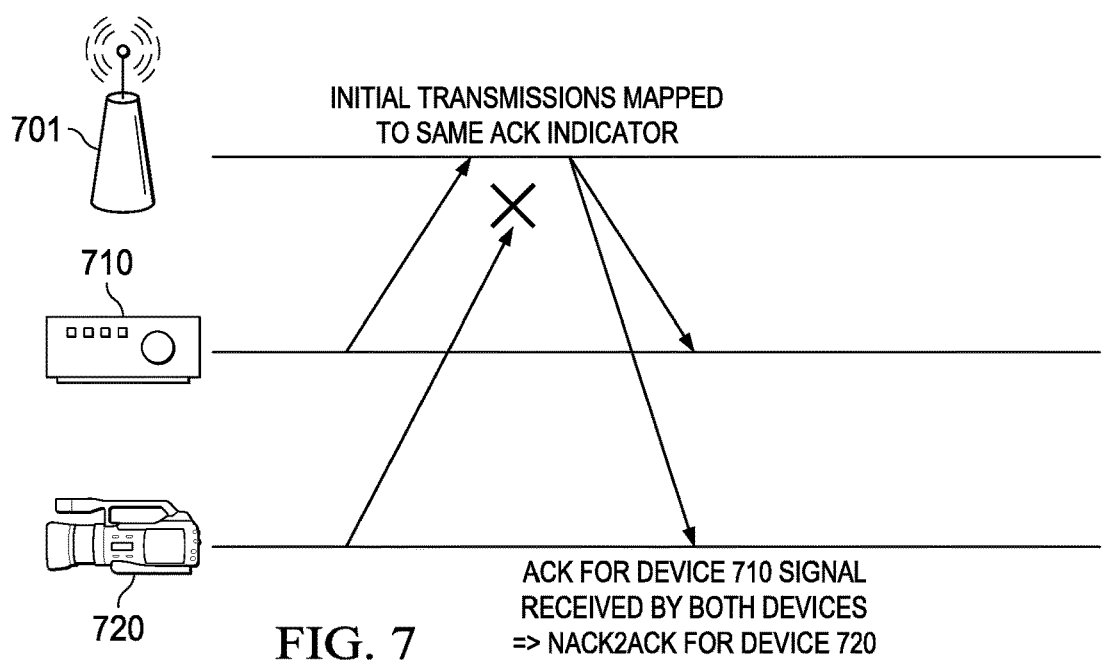
FIG. 7 shows a scenario of using the same ACK for wireless transmissions of multiple transmitters according to an embodiment of the disclosure.

FIG. 7 shows a scenario of using the same ACK indicator for wireless transmissions of multiple transmitters according to an embodiment of the disclosure. The scheme addresses the NACK2ACK situation described above. The two devices 710 and 720 (e.g., a set-top box and a camera device respectively) send on different resources high reliability transmissions for services to a network node 701 (e.g., a base station). Since the ACK signal for both services shares the same resource, both device 710 and 720 receive the ACK when device 710 signal is received successfully and device 720 signal is lost. In the absence of further information, device 720 would receive the ACK signal and assume that its transmission had been successfully received, i.e., device 720 would experience a NACK2ACK error. In this situation, an indicator is added to the ACK signal on downlink to indicate which of the two services is successfully received. Thus, the two devices 710 and 720 can determine which of the two services was successfully received or lost.

The scenario above shows two transmitters for two services. However, the scheme can be extended to any suitable number of services. This is a group-ACK scheme that depends on the availability of downlink bandwidth to signal the identifiers for the successfully received services. In the case where the high reliability transmission services are registered per-cell, short service identifiers could be used. Furthermore, since the base station 701 knows which subset of services could be transmitting on uplink resources assigned to the same ACK resource, it may be able to truncate or otherwise hash the identifiers, as long as the resulting value is unique within that group.

In addition to downlink bandwidth, factors such as latency requirements and duty cycles of active services need to be considered to determine a suitable group-ACK scheme. For instance, in some scenarios, downlink scheduling can be used to address each individual device whose transmission needs to be acknowledged. In other scenarios, where the latency requirement may be too tight to allow a closed-loop retransmission approach, a slower layer 2, transmission control protocol (TCP), or application-layer acknowledgement may be used for each service separately to let the transmitter know that its transmission failed.

Figure 8:
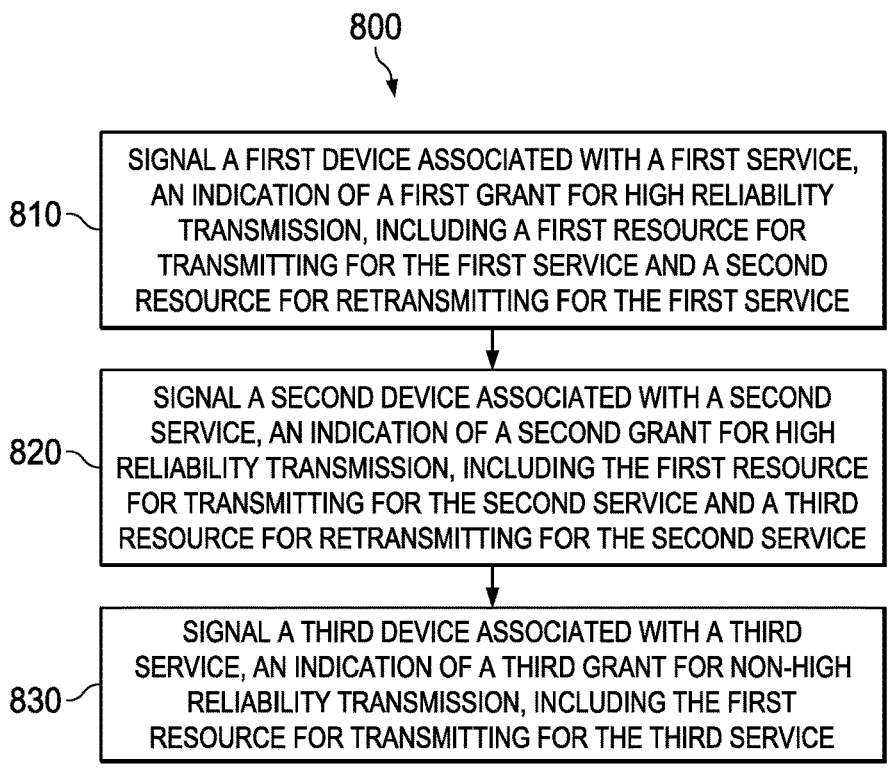
FIG. 8 shows an embodiment method of allocating and coordinating resources for high reliability communications.

FIG. 8 shows an embodiment method 800 of allocating and coordinating resources for high reliability transmissions. At block 810, a network entity (e.g., a base station) signals a first device associated with a first service, an indication of a first grant for high reliability transmission. The first grant (e.g., a first UHR grant) includes a first resource for transmitting for the first service and a second resource for retransmitting for the first service. At block 820, the network entity signals a second device associated with a second service, an indication of a second grant (e.g., UHR grant) for high reliability transmission. The second UHR grant includes the first resource for transmitting for the second service and a third resource for retransmitting for the second service. For example, the two transmitters of FIG. 3 are assigned a same resource for initial transmissions for their respective services, but are assigned different periods for their retransmissions 310 and 320. At step 830, the network entity signals a third device associated with a third service, an indication of a third grant (e.g., SPS grant) for non-high reliability transmission. The third grant includes the first resource for transmitting for the third service. For example, in FIG. 2, device 210 is assigned a SPS grant on the same resources 290 with the UHR grants for devices 220 and 230.

Figure 9:
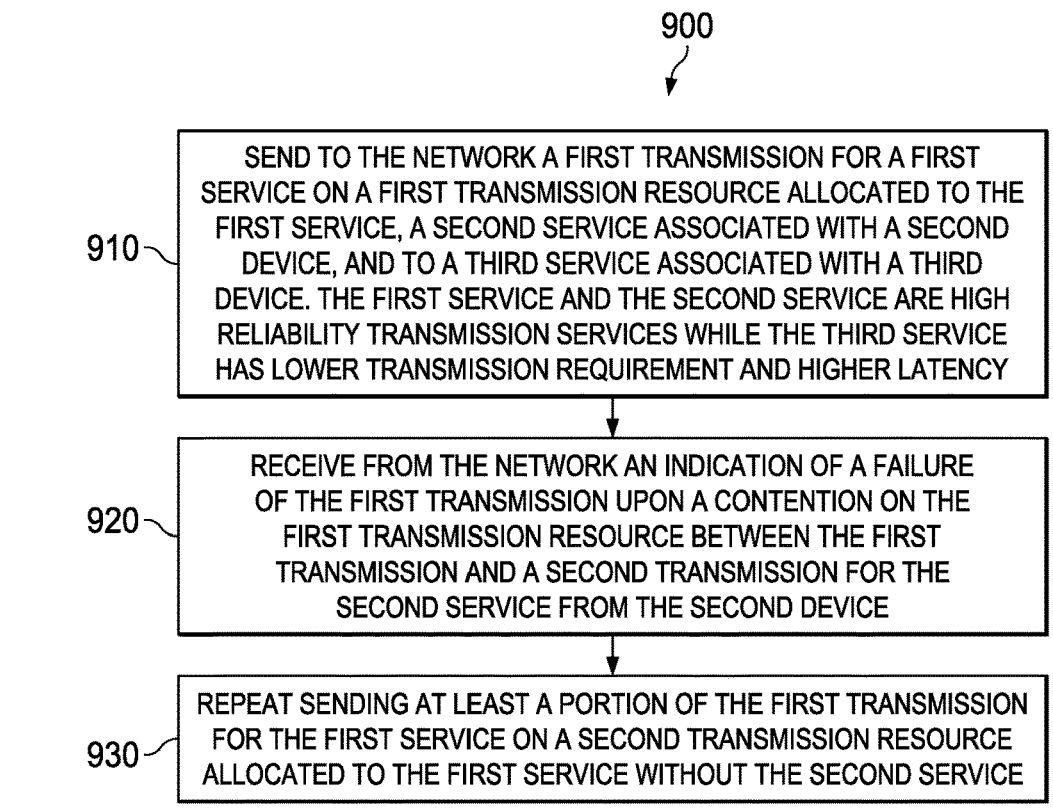
FIG. 9 shows an embodiment method to handle transmission failure among multiple high reliability transmissions from multiple transmitters.

FIG. 9 shows an embodiment method 900 to handle transmission failure among multiple high reliability transmissions from multiple transmitters to a network. At block 910, a first device sends to the network a first transmission for a first service on a first transmission resource allocated to the first service. The first transmission resource is also allocated by the network to a second service associated with a second device, and to a third service associated with a third device. The first service and the second service are high reliability transmission services (e.g., UHR services), while the third service has lower transmission reliability requirement and higher latency. At block 920, the first device receives from the network an indication of a failure of the first transmission (e.g., a NACK) upon a contention on the first transmission resource between the first transmission and a second transmission for the second service from the second device. At block 930, the first device repeats sending at least a portion of the first transmission for the first service on a second transmission resource allocated to the first service without the second service. For example, device 510 of FIG. 5 resends the fifth symbol 505 upon receiving a NACK from the network which fails to receive this symbol. The retransmission is sent on a resource block such as a TTI that is not shared for a second service with similar high reliability and low latency requirements.

Figure 10:
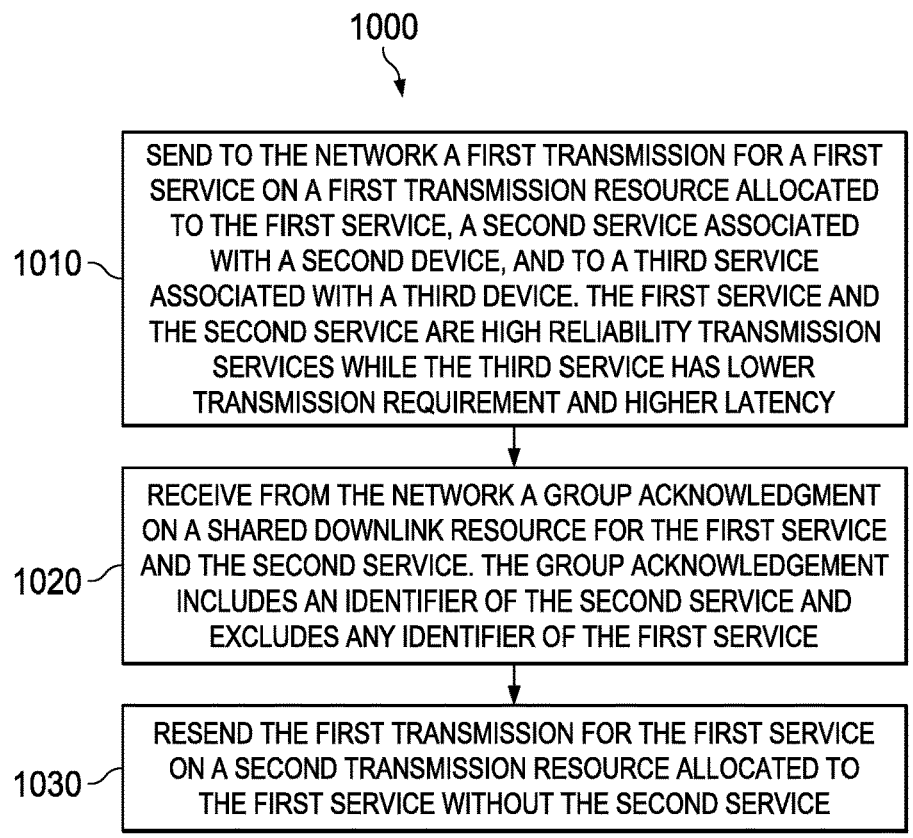
FIG. 10 shows an embodiment of another method to handle transmission failure among multiple high reliability transmissions from multiple transmitters.

FIG. 10 shows an embodiment of another method 1000 to handle transmission failure among multiple high reliability transmissions from multiple transmitters to a network. At block 1010, a first device sends to the network a first transmission for a first service on a first transmission resource allocated to the first service. The first transmission resource is also allocated by the network to a second service associated with a second device, and to a third service associated with a third device. The first service and the second service are high reliability transmission services (e.g., UHR services), while the third service has lower transmission reliability requirement and higher latency. At block 1020, the first device receives from the network a group acknowledgment on a shared downlink resource for the first service and the second service. The group acknowledgement includes an identifier of the second service and excludes any identifier of the first service. At block 1030, the first device resends the first transmission for the first service on a second transmission resource allocated to the first service without the second service. The first device resends the first transmission on the second transmission resource upon detecting the absence of an identifier for the first service in the group acknowledgement.

Figure 11:
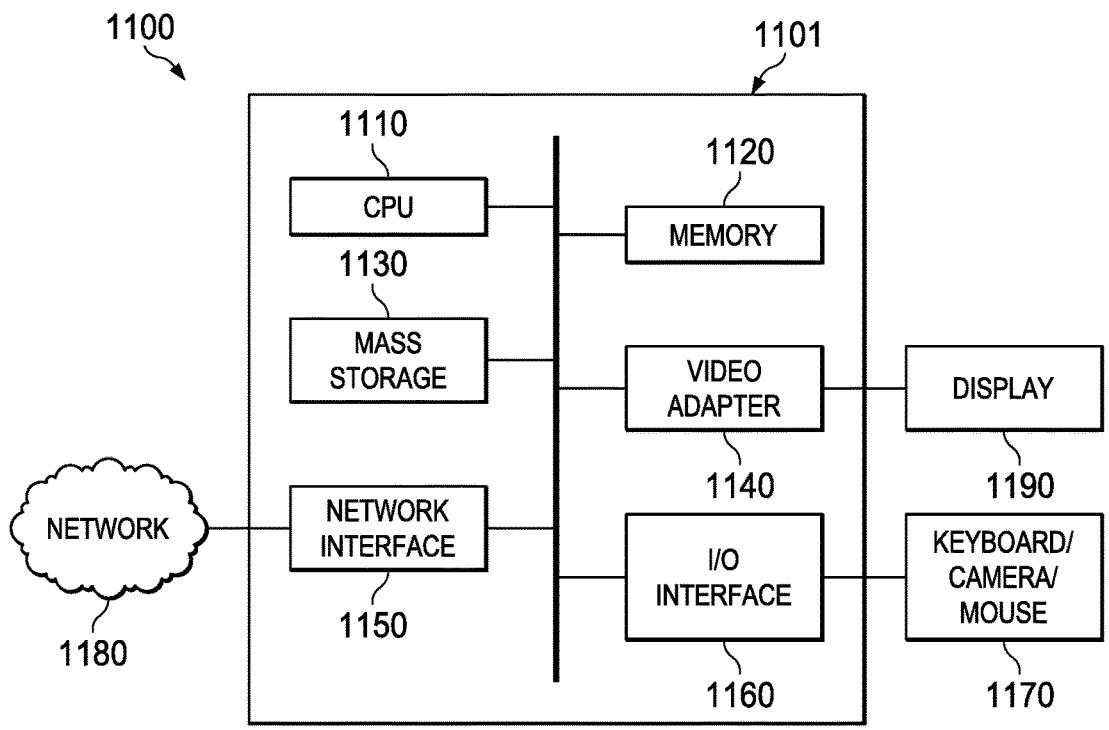
FIG. 11 is a diagram of a processing system that can be used to implement various embodiments.

FIG. 11 is a block diagram of a processing system 1100 that can be used to implement various embodiments including the methods above. For instance, the processing system 1100 can be, or is part of, a user or mobile device such as a smartphone, a computer tablet, or other suitable or mobile devices, such as a vehicle or a M2M device. The processing system 1100 can also be part of network entity such as a base station. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1100 may comprise a processing unit 1101 equipped with one or more input/output devices, such as a speaker, microphone, mouse, touchscreen, keypad, keyboard, printer, display, and the like. The input/output devices also include a camera for capturing digital picture or video. The processing unit 1101 may include a central processing unit (CPU) 1110, a memory 1120, a mass storage device 1130, a video adapter 1140, and an I/O interface 1160 connected to a bus. The bus may be one or more of any type of several bus architectures including a memory bus or memory controller, a peripheral bus, a video bus, or the like.

The CPU 1110 may comprise any type of electronic data processor. The memory 1120 may comprise any type of system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs. In embodiments, the memory 1120 is non-transitory. The mass storage device 1130 may comprise any type of storage device configured to store data, programs, and other information and to make the data, programs, and other information accessible via the bus. The mass storage device 1130 may comprise, for example, one or more of a solid state drive, hard disk drive, a magnetic disk drive, an optical disk drive, or the like.

The video adapter 1140 and the I/O interface 1160 provide interfaces to couple external input and output devices to the processing unit. As illustrated, examples of input and output devices include a display or touchscreen 1190 coupled to the video adapter 1140 and any combination of camera/keyboard/mouse 1170 coupled to the I/O interface 1160. Other devices may be coupled to the processing unit 1101, and additional or fewer interface cards may be utilized. For example, a serial interface card (not shown) may be used to provide a serial interface for a printer.

The processing unit 1101 also includes one or more network interfaces 1150, which may comprise wired links, such as an Ethernet cable or the like, and/or wireless links to access nodes or one or more networks 1180. The network interface 1150 allows the processing unit 1101 to communicate with remote units via the networks 1180. For example, the network interface 1150 may provide wireless communication via one or more transmitters/transmit antennas and one or more receivers/receive antennas. In an embodiment, the processing unit 1101 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for managing wireless transmissions from multiple transmitters, the method comprising:
    sending, by a network entity, a first grant to a first device associated with a first service, the first grant assigning a first resource for data transmissions associated with the first service and a second resource for data retransmissions associated with the first service, the first resource being a contention-based resource;
    sending, by the network entity, a second grant to a second device associated with a second service, the second grant assigning the first resource for data transmissions associated with the second service and a third resource for data retransmissions associated with the second service; and
    sending, by the network entity, a third grant to a third device associated with a third service, the third grant assigning the first resource for data transmissions associated with the third service without assigning any resources for data retransmissions associated with the third service, wherein the first service and the second service having higher transmission reliability requirements than the third service.

2. The method of claim 1, wherein the first service and the second service have shorter transmission latency requirements than the third service.

3. The method of claim 1, wherein the data transmissions associated with the first service and the data transmissions associated with the second service have a higher transmit power level setting than the data transmissions associated with the third service to increase the likelihood that the data transmissions associated with the first service and the data transmissions associated with the second service will be successfully received in the event they collide with the data transmissions associated with the third service.

4. The method of claim 1, wherein the first grant, the second grant, and the third grant assign the first resource, as the contention-based resource, to the data transmissions associated with the first service, the data transmission associated with the second service, and the data transmission associated with the third service without scheduling transmissions of the first device, the second device, and the third device.

5. The method of claim 1 further comprising:
    sending to the first device updates for the first grant for the first service upon the first device changing its scheduler entity; and
    sending to the second device updates for the second grant for the second service upon the second device changing its scheduler entity.

6. The method of claim 5, wherein the updates for the first grant and the second grant indicate measured channel conditions for the first service and the second service or changes of modulation and coding scheme (MCS) settings for the first service and the second service.

7. The method of claim 1 further comprising:
    upon establishing the first service and the second service, performing an authorization procedure of the first device for the first service and of the second device for the second service; and
    upon successful authorization of the first device and the second device, registering the first device with the first service and registering the second device with the second service.

8. The method of claim 1, wherein the first resource, the second resource, and the third resource are time resources, frequency resources, code resources, or combinations thereof.

9. The method of claim 1, wherein the first resource, the second resource, and the third resource are transmission time intervals (TTIs) or symbols within TTIs.

10. A network entity for managing wireless transmissions from multiple transmitters, the network entity comprising:
    at least one processor coupled to a memory; and
    a non-transitory computer readable storage medium storing programming for execution by the at least one processor, the programming including instructions to:
    send a first grant to a first device associated with a first service, the first grant assigning a first resource for data transmissions associated with the first service and a second resource for data retransmissions associated with the first service, the first resource being a contention-based resource;
    send a second grant to a second device associated with a second service, the second grant assigning the first resource for data transmissions associated with the second service and a third resource for data retransmissions associated with the second service; and
    send a third grant to a third device associated with a third service, the third grant assigning the first resource for data transmissions associated with the third service without assigning any resources for data retransmissions associated with the third service, wherein the first service and the second service have higher transmission reliability requirements than the third service.

11. The network entity of claim 10, wherein the first service and the second service have shorter transmission latency requirements than the third service.

12. The network entity of claim 10, wherein the data transmissions associated with the first service and the data transmissions associated with the second service have a higher transmit power setting than the data transmissions associated with the third service to increase the likelihood that the data transmissions associated with the first service and the data transmissions associated with the second service will be successfully received in the event they collide with the data transmissions associated with the third service.

13. The network entity of claim 10, wherein the first grant is sent to the first device and the second grant is sent to the second device without scheduling transmissions for the first device and the second device.

14. The network entity of claim 10, wherein the programming further includes instructions to:
send to the first device updates for the first grant for the first service upon the first device changing its scheduler entity; and
send to the second device updates for the second grant for the second service upon the second device changing its scheduler entity.

15. The network entity of claim 14, wherein the updates for the first grant and the second grant indicate measured channel conditions for the first service and the second service or changes of a modulation and coding scheme (MCS) settings for the first service and the second service.

16. The network entity of claim 10, wherein the programming further includes instructions to:
upon establishing the first service and the second service, perform an authorization procedure of the first device for the first service and of the second device for the second service; and
upon successful authorization of the first device and the second device, register the first device with the first service and registering the second device with the second service.

17. The network entity of claim 10, wherein the first resource, the second resource, and the third resource are time resources, frequency resources, code resources, or combinations thereof.

18. The network entity of claim 10, wherein the first resource, the second resource, and the third resource are transmission time intervals (TTIs) or symbols within TTIs.

19. The network entity of claim 10, wherein the data transmissions associated with the first service and the data transmissions associated with the second service have a higher modulation and coding scheme (MCS) setting than the data transmissions associated with the third service to increase the likelihood that the data transmissions associated with the first service and the data transmissions associated with the second service will be successfully received in the event they collide with the data transmissions associated with the third service.

20. The network entity of claim 10, wherein the first grant, the second grant, and the third grant assign the first resource, as the contention-based resource, to the data transmissions associated with the first service, the data transmission associated with the second service, and the data transmission associated with the third service without scheduling transmissions of the first device, the second device, and the third device.

21. The method of claim 1, wherein the data transmissions associated with the first service and the data transmissions associated with the second service have a higher modulation and coding scheme (MCS) setting than the data transmissions associated with the third service to increase the likelihood that the data transmissions associated with the first service and the data transmissions associated with the second service will be successfully received in the event they collide with the data transmissions associated with the third service.

* * * * *